(12) United States Patent
Gilmartin et al.

(10) Patent No.: US 8,103,256 B2
(45) Date of Patent: Jan. 24, 2012

(54) METHOD AND SYSTEM FOR ROUTING CALLS TO AN ADVISOR FROM MOBILE CUSTOMERS WITHIN A MOBILE VEHICLE COMMUNICATIONS SYSTEM

(75) Inventors: David P. Gilmartin, Rochester Hills, MI (US); Edward P. Chrumka, Grosse Pointe Park, MI (US)

(73) Assignee: General Motors LLC, Detroit, MI (US)

( * ) Notice: Subject to any disclaimer, the term of this patent is extended or adjusted under 35 U.S.C. 154(b) by 909 days.

(21) Appl. No.: 12/113,168

(22) Filed: Apr. 30, 2008

(65) Prior Publication Data
US 2009/0275311 A1 Nov. 5, 2009

(51) Int. Cl.
*H04M 3/42* (2006.01)
(52) U.S. Cl. ............... 455/414.1; 709/217; 709/219; 370/349
(58) Field of Classification Search .......... 455/405, 455/414.1, 411, 404.1, 426.1, 445, 456.3, 455/563, 428; 340/436, 425.5; 370/328; 701/29, 33, 209, 214, 200, 35; 700/245
See application file for complete search history.

(56) References Cited

U.S. PATENT DOCUMENTS

| | | | |
|---|---|---|---|
| 5,974,120 A | 10/1999 | Katz | |
| 7,130,406 B2 | 10/2006 | Pines et al. | |
| 7,177,634 B2 | 2/2007 | Wang et al. | |
| 7,245,925 B2 | 7/2007 | Zellner | |
| 7,505,921 B1* | 3/2009 | Lukas et al. | 705/26.5 |
| 2003/0103482 A1* | 6/2003 | Van Bosch | 370/338 |
| 2005/0065711 A1* | 3/2005 | Dahlgren et al. | 701/117 |
| 2005/0187682 A1 | 8/2005 | Gault et al. | |
| 2005/0254460 A1* | 11/2005 | Fraser et al. | 370/328 |
| 2005/0288827 A1 | 12/2005 | Watkins | |
| 2006/0064232 A1* | 3/2006 | Ampunan et al. | 701/115 |
| 2006/0217935 A1* | 9/2006 | Beiermeister et al. | 702/188 |
| 2006/0294200 A1* | 12/2006 | Lee | 709/217 |
| 2007/0173986 A1* | 7/2007 | Inbarajan | 701/2 |
| 2008/0071882 A1* | 3/2008 | Hering et al. | 709/217 |

* cited by examiner

*Primary Examiner* — Nick Corsaro
*Assistant Examiner* — Mahendra Patel
(74) *Attorney, Agent, or Firm* — Dierker & Associates, P.C.

(57) ABSTRACT

A method is disclosed for enhancing call center services. The method comprises: receiving at the call center a call from a user; analyzing a phone number associated with the call, a location of a vehicle associated with the call, a current request of the user, a previous request of the user, and a time period between the previous request and the current request; presenting a list of menu options to the user based on the analysis; and routing the call to an advisor based on a received user selected menu option. In addition, a system is disclosed for enhancing call center services.

13 Claims, 2 Drawing Sheets

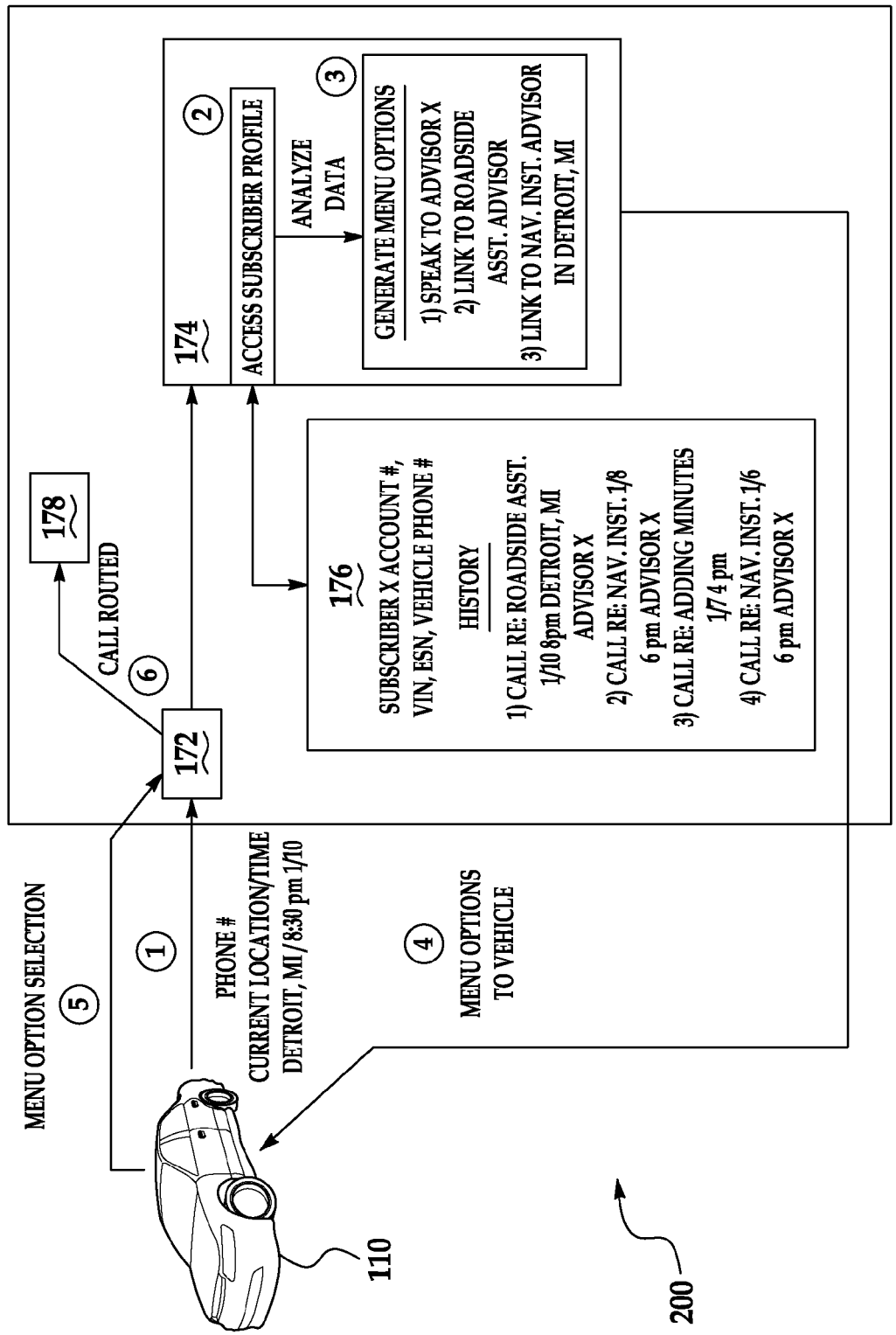

US 8,103,256 B2

METHOD AND SYSTEM FOR ROUTING CALLS TO AN ADVISOR FROM MOBILE CUSTOMERS WITHIN A MOBILE VEHICLE COMMUNICATIONS SYSTEM

TECHNICAL FIELD

The present disclosure relates generally to a method and system for routing calls to an advisor from mobile customers within a mobile vehicle communications system.

BACKGROUND

Many passenger vehicles incorporate an integrated communication system, which includes a Vehicle Communication Unit (VCU) and a Wide Area Network (WAN), such as a cellular telephone network or a satellite communication system. The combination of these systems allows for a variety of fee-based subscription services to be provided in a mobile environment. The VCU may be a vehicle telematics unit/device including at least a cellular radio, a satellite transceiver and a global positioning system (GPS). Communication generally takes place through a carrier service, and may be initiated at the VCU at turn-on or through manual or voice command phone number entry. A radio communication link may be established between the VCU and a Wide Area Network (WAN), using a node of the WAN in the vicinity of the VCU. In addition to enabling telecommunication services, the telematics unit/device may be configured to perform various processing functions and/or to exchange various types of data through a service provider.

SUMMARY

The present application is directed to a method for enhancing call center services. The method includes: a) receiving, at the call center, a call from a user; b) analyzing a phone number associated with the call, a location of a vehicle associated with the call, a current request of the user, a previous request of the user, and a time period between the previous request and the current request; c) presenting a list of menu options to the user based on the analysis; and d) routing the call to an advisor based on a received user selected menu option. A system for enhancing call center services is also disclosed herein.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 2 is a block diagram of a portion of the system illustrating a method for routing calls from a mobile customer within a mobile vehicle communications system.

DETAILED DESCRIPTION

Figure 1:
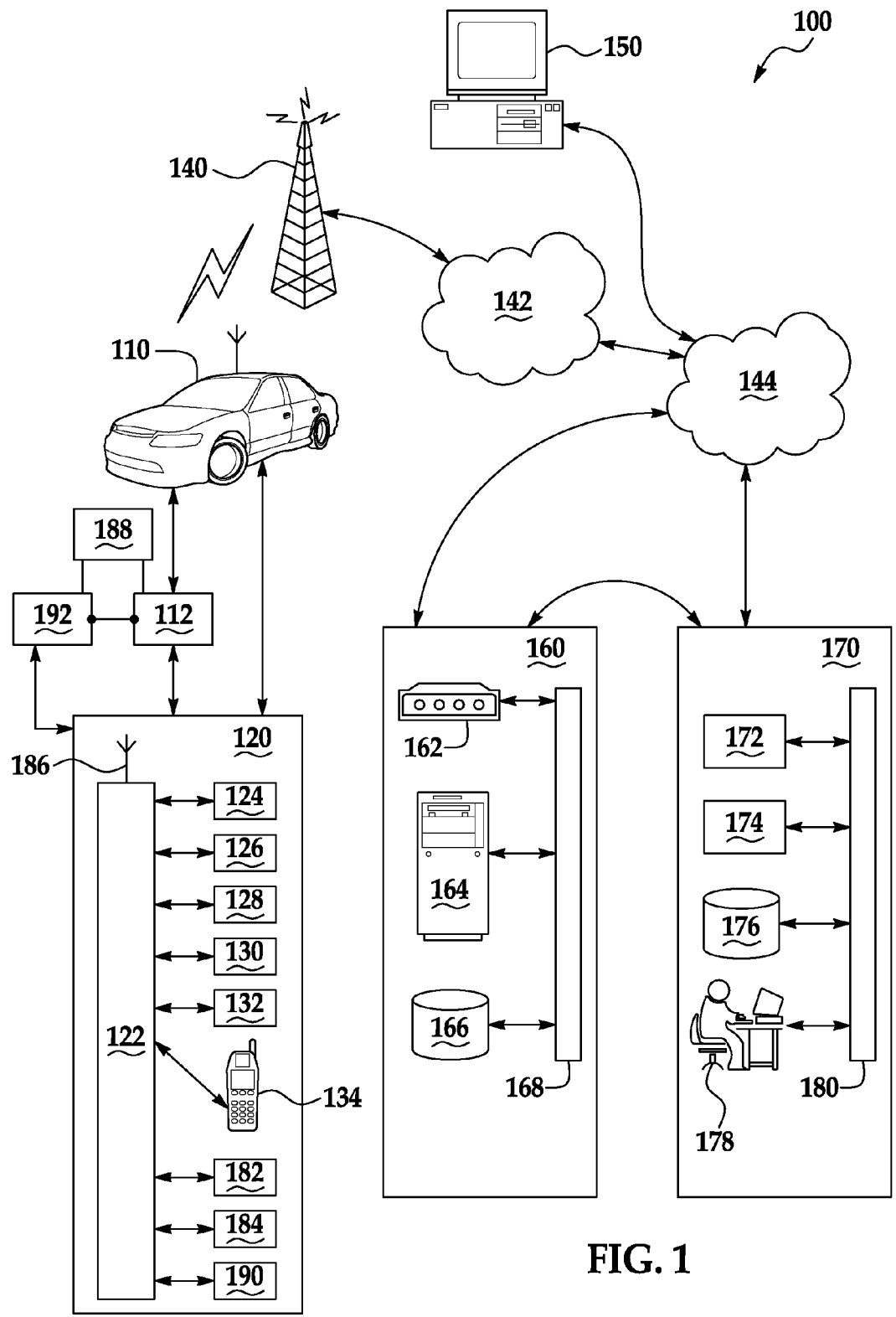
FIG. 1 is a schematic view of an example of the system for routing calls from mobile customers within a mobile vehicle communications system.

Examples of the system and method disclosed herein advantageously route customers, in a relatively efficient manner, to a technically trained customer service advisor or department in order to answer questions, diagnose problems and/or implement services.

It is to be understood that, as used herein, the term "user" includes vehicle owners, operators, and/or passengers. It is to be further understood that the term "user" may be used interchangeably with subscriber/service subscriber.

The terms "connect/connected/connection", and the associated terms "route/routed/routing", and/or the like are broadly defined herein to encompass a variety of divergent connected arrangements, the establishment of such divergent connected arrangements, and various assembly techniques. These arrangements and techniques include, but are not limited to (1) the direct communication between one component and another component with no intervening components therebetween; and (2) the communication of one component and another component with one or more components therebetween, provided that the one component being "connected to" or "routed to" the other component is somehow in operative communication or will be operatively communicating with the other component (notwithstanding the presence of one or more additional components therebetween). Additionally, two components may be permanently, semi-permanently, or releasably engaged with and/or connected to one another.

It is to be further understood that "communication" is to be construed to include all forms of communication, including direct and indirect communication. As such, indirect communication may include communication between two components with additional component(s) located therebetween.

FIG. 1 is an illustrative operating environment for routing calls from mobile customers within a mobile vehicle communications system. FIG. 1 shows a mobile vehicle communication system 100. Mobile communication system 100 includes at least one mobile vehicle 110 including vehicle communication bus 112 and vehicle communications unit (VCU) 120, one or more wireless carrier systems 140, one or more communication networks 142, one or more land networks 144, one or more client, personal or user computers 150, one or more web-hosting portals 160, and one or more call centers 170.

The overall architecture, setup and operation, as well as many of the individual components of the system 100 shown in FIG. 1 are generally known in the art. Thus, the following paragraphs provide a brief overview of one example of such a system 100. It is to be understood, however, that additional components and/or other systems not shown here could employ the method(s) disclosed herein.

In one example, mobile vehicle 110, such as a motorcycle, car, truck, recreational vehicle (RV), boat, plane, etc., is equipped with suitable hardware and software for transmitting and receiving voice and data communications. The hardware and/or software enables the mobile vehicle 110 to communicate over the wireless carrier system 140.

Some of the vehicle hardware is shown generally in FIG. 1, including the vehicle communications unit 120 and other components that are operatively connected to the vehicle communications unit 120. In one example, the vehicle communications unit 120 is an on-board telematics unit/device that provides a variety of services, both individually and through its communication with the call center 170. The vehicle communications unit 120 generally includes a digital signal processor (DSP) 122 connected to a wireless modem 124, a navigation unit containing a location detection chipset/component (e.g., a global positioning system (GPS)) 126, an in-vehicle memory 128, such as, for example, a non-volatile flash memory, a microphone 130, one or more speakers 132, and an embedded or in-vehicle mobile phone 134. In one example, the wireless modem 124 includes a computer program and/or set of software routines executing within DSP 122.

As shown in FIG. 1, the vehicle communications unit 120 may also include a real-time clock (RTC) 182, a short-range wireless communication network (e.g., a BLUETOOTH® unit) 184, and/or a dual antenna 186. It is to be understood that the vehicle communications unit 120 may be implemented without one or more of the above listed components, such as, for example, the short-range wireless communication network 184. It is to be further understood that vehicle communications unit 120 may also include additional components and functionality as desired for a particular end use.

In one example, DSP 122 is a microcontroller, controller, host processor, or vehicle communications processor. In an example, DSP 122 is implemented as an application specific integrated circuit (ASIC). Alternatively, DSP 122 may be a processor working in conjunction with a central processing unit (CPU) performing the function of a general-purpose processor.

The location detection chipset/component 126 may include a Global Position System (GPS) receiver, a radio triangulation system, a dead reckoning position system, and/or combinations thereof In particular, a GPS receiver provides accurate time and latitude and longitude coordinates of the vehicle 110 responsive to a GPS broadcast signal received from a GPS satellite constellation (not shown).

In-vehicle mobile telephone system 134 is a cellular-type phone, such as, for example, an analog, digital, dual-mode, dual-band, multi-mode or multi-band cellular phone. In one example, the mobile telephone system is an analog mobile telephone system operating over a prescribed band nominally at 800 MHz. In another example, the mobile telephone system is a digital mobile telephone system operating over a prescribed band nominally at 800 MHz, 900 MHz, 1900 MHz, or any suitable band capable of carrying digital cellular communications.

Also associated with the DSP 122 is the previously mentioned real time clock (RTC) 182, which provides accurate date and time information to the vehicle communications unit 120 hardware and software components that may require and/or request such date and time information. In an example, the RTC 182 may provide date and time information periodically, such as, for example, every ten milliseconds.

DSP 122 executes various computer programs and communication control and protocol algorithms that affect communication, programming and operational modes of electronic and mechanical systems within the vehicle 110. In one example, DSP 122 is an embedded system controller. In another example, DSP 122 affects communications between telematics device 120, wireless carrier system 140, and call center 170. In another example, DSP 122 provides the functionality of a human speech recognition system (ASR) module. DSP 122 is configured to generate and receive digital signals transmitted between telematics device 120 and a vehicle communication bus 112 that is connected to various electronic modules in the vehicle 110. In one example, the digital signals activate a programming mode and various operational modes, as well as facilitate data transfer. In another example, a program facilitates the transfer of data between vehicle 110 and a call center 170. Such data includes, as non-limiting examples, the phone number of the vehicle 110, the location of the vehicle 110, and a list of menu options generated by the call center 170 for the user (discussed further hereinbelow).

Mobile vehicle 110, via a vehicle communication bus 112, sends signals to and receives signals from various units of equipment and systems both outside the vehicle 110 and within vehicle 110 to perform various functions, such as monitoring the operational state of the vehicle systems, collecting and storing data from the vehicle systems, providing instructions, data and programs to various vehicle systems and outpulsing (dialing) calls from telematics devices 120. In facilitating interactions among the various communication and electronic modules, vehicle communication bus 112 utilizes bus interfaces such as controller-area network (CAN), a media oriented system transfer (MOST), a local interconnection network (LIN), an Ethernet, and other appropriate connections such as those that conform with known ISO, SAE, and IEEE standards and specifications, to name a few. In one example, vehicle communication bus 112 is a direct connection between connected devices.

Microphone 130 provides the user with a means for inputting verbal or other auditory commands, and can be equipped with an embedded voice processing unit utilizing human/machine interface (HMI) technology known in the art. Conversely, speaker 132 provides verbal output to the vehicle occupants and can be either a stand-alone speaker specifically dedicated for use with the telematics unit 120 or can be part of a vehicle audio component (not shown). In either event and as previously mentioned, microphone 130 and speaker 132 enable vehicle hardware and call center 170 to communicate with the occupants through audible speech. The vehicle hardware also includes one or more buttons, knobs, switches, keyboards, and/or controls for enabling a vehicle occupant to activate or engage one or more of the vehicle hardware components. In one example, one of the buttons may be an electronic pushbutton used to initiate voice communication with the call center 170. In another example, one of the buttons may be used to initiate emergency services.

The audio component (not shown) is operatively connected to the vehicle bus 112 and an audio bus 192. The audio component receives analog information, rendering it as sound, via the audio bus 192. Digital information is received via the vehicle bus 112. The audio component provides AM and FM radio, satellite radio, CD, DVD, multimedia and other like functionality independent of an infotainment center 188. The audio component may contain a speaker system, or may utilize speaker 132 via arbitration on vehicle bus 112 and/or audio bus 192.

A vehicle crash and/or collision detection sensor interface (not shown) is/are operatively connected to the vehicle bus 112. The crash sensors provide information to the telematics unit 120 via the crash and/or collision detection sensor interface regarding the severity of a vehicle collision, such as the angle of impact and the amount of force sustained.

Other vehicle sensors (also not shown), connected to various sensor interface modules are operatively connected to the vehicle bus 112. Example vehicle sensors include, but are not limited to, gyroscopes, accelerometers, magnetometers, emission detection and/or control sensors, and/or the like. Non-limiting example sensor interface modules include powertrain control, climate control, body control, and/or the like.

In a non-limiting example, the vehicle hardware includes a display 190, which may be operatively connected to the telematics unit 120 directly (as shown in FIG. 1), or may be part of the audio component. Non-limiting examples of the display 190 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

Vehicle 110, via telematics device 120, sends and receives radio transmissions from wireless carrier system 140 to transmit both voice and data communications. It is to be understood that voice communications are generally enabled via the in-vehicle mobile phone 134 and data communications are enabled via the wireless modem 124. In order to enable successful data transmission over the voice channel, wireless modem 124 applies some type of encoding or modulation to convert the digital data so that it can communicate through a vocoder or speech codec incorporated in the in-vehicle mobile phone 134. It is to be understood that any suitable encoding or modulation technique that provides an acceptable data rate and bit error may be used with the examples disclosed herein. Generally, dual mode antenna 186 services the location detection chipset/component 126 and the cellular chipset/component 134.

Wireless carrier system 140 is implemented as any suitable system for transmitting a signal from mobile vehicle 110 to communication network 142. Wireless carrier system 140 incorporates any type of telecommunications in which electromagnetic waves carry signal over part of or the entire communication path. In one example, wireless carrier system 140 transmits analog audio and/or video signals. In an example, wireless carrier system 140 transmits analog audio and/or video signals such as those sent from AM and FM radio stations and transmitters, or digital audio signals in the S band (approved for use in the U.S.) and L band (used in Europe and Canada). In one example, wireless carrier system 140 is a satellite broadcast system broadcasting over a spectrum in the "S" band (2.3 GHz) that has been allocated by the U.S. Federal Communications Commission (FCC) for nationwide broadcasting of satellite-based Digital Audio Radio Service (DARS).

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to mobile vehicle 110 and land network 144. In one example, wireless carrier system 140 includes a short message service, modeled after established protocols such as IS-637 SMS standards, IS-136 air interface standards for SMS, and GSM 03.40 and 09.02 standards. Similar to paging, an SMS communication could be broadcast to a number of regional recipients. In another example, the carrier system 140 uses services in accordance with other standards, such as, for example, IEEE 802.11 compliant wireless systems and BLUETOOTH® compliant wireless systems. In yet another example, a cellular System Identifier (SID) table at telematics device 120 identifies a preferred carrier system 140. Still further, a telematics device 120 initiating a communication through communication network 142 selects a preferred carrier or a secondary carrier based on an SID table, prevailing network traffic and other considerations. In one example, a preferred or secondary carrier identified in an SID table is configured with a home location register (HLR). A visitor location register (VLR) may connect two HLRs for operation, as is understood in the art. Furthermore, a so-called "side-switch carrier change" is enabled to change from one carrier to another between calls, as will be known to the skilled practitioner. In still another example, a carrier having a home location register enables authenticated call connections with a "handshake" exchange of telematics device 120 and call center 170 identification data after the authentication.

Land network 144 may be a conventional land-based telecommunications network that is connected to one or more landline telephones and connects wireless carrier/communication network 140/142 to call center 170. For example, land network 144 may include a public switched telephone network (PSTN) and/or an Internet protocol (IP) network. It is to be understood that one or more segments of the land network 144 may be implemented in the form of a standard wired network, a fiber or other optical network, a cable network, a virtual private network (VPN), other wireless networks such as wireless local networks (WLANs) or networks providing broadband wireless access (BWA), or any combination thereof. Land network 144 connects communication network 142 to user computer 150, web-hosting portal 160, and call center 170. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and optionally, over wired or wireless communication networks 142 to web-hosting portal 160 and vehicle 110. Personal or user computer 150 sends data to web-hosting portal 160 through a webpage interface using communication standards such as hypertext transport protocol (HTTP), and transport-control protocol/Internet protocol (TCP/IP).

Call center 170 is a location where one or more calls are received and serviced at the same time and where one or more calls are sent from at the same time. In one example, the call center 170 is a telematics call center, facilitating communications to and from the telematics device 120 in vehicle 110. The call center 170 may be a voice call center, providing verbal communications between an advisor in the call center 170 and a subscriber in a mobile vehicle 110. In another example, the call center 170 communicated with both the telematics unit 120 and subscribers.

The call center 170 is designed to provide the telematics unit 170 with a number of back-end functions, and includes one or more communication interfaces/telephony systems 172, such as voice and data modems and switches, one or more communication services managers 174, one or more communication services databases 176, one or more communication services advisors 178 (e.g., a live advisor or an automated response system), and one or more network connections or buses 180 (similar to the vehicle bus 112 previously described).

Communication interface 172 of call center 170 connects to land network 144. Communication interface 172 transmits voice or data transmissions from call center 170, and receives voice or data transmissions from telematics device 120 in mobile vehicle 110 through wireless carrier system 140 and/or wireless modem 124, communication network 142, and land network 144. The communication interface 172, which may be a private branch exchange (PBX) switch, routes incoming signals so that the voice transmissions are usually sent to either the advisor 178, and data transmissions are passed on to the communication services managers 174, which may include a modem or other piece of equipment (not shown) for demodulation and further signal processing. In addition, communication services database 176 sends to or receives data transmissions from one or more communications services advisors 178 via network 180. Communication services advisor 178 receives from or sends to communication interface 172 voice or data transmissions.

The user initiates service requests to the call center 170 by sending a voice or digital-signal command to the telematics device 120, which, in turn, sends an instructional signal, device identification signal or a voice call through wireless modem 124, wireless carrier system 140, communication network 142, and land network 144 to the call center 170. In one example, a user initiates a service request by activating a tactile or voice-operated user interface associated with the telematics unit 120.

When a call is received by the communication interface 172, the interface 172 may transmit the data associated with the call (e.g., phone number of calling device, location of calling device, and time and/or date of call) to the communications services manager 174 for analysis. The caller may be placed on hold while the analysis occurs. It is to be understood that the analysis is relatively quick, and will advantageously assist the communications interface 172 in routing the call to an appropriate advisor 178 for assisting the user. It is believed that such analysis will minimize or eliminate routing of the user's call to one or more inappropriate advisors.

The communication services manager 174 is a module including any suitable hardware and software capable of providing communication services to telematics device 120 in mobile vehicle 110 and for analyzing data transmitted or otherwise communicated during a call from a user. Communication services manager 174 sends to or receives data transmissions from the communications interface 172, one or more communication services databases 176 or one or more communication services advisors 178 via the network 180.

Communication services manager 174 can facilitate, by assisting in routing the user's call to an appropriate advisor 178, one or more services, including, but not limited to, enrollment services, navigation assistance, directory assistance, roadside assistance, business or residential assistance, information services assistance, emergency assistance, communications assistance, retrieval of vehicle telematics device data, or combinations thereof.

In an example, communication services manager 174 receives information from, for example, the telematics unit 120 through the communication interface 172. Such information is received and analyzed, and may include, as non-limiting examples, the following: the phone number associated with the call, the location of the vehicle 110 associated with the call, and a time/date of the current request. It is to be understood that the phone number, location and time/date are generally data transmissions sent from the telematics unit 120. The request for services itself may initially be a verbal request (received by the communication interface 172) that is transmitted to the communication service manager 174 in data form. The nature of the request may or may not be transmitted to the communication services manager 174.

Other information that may be transmitted with a call from within the vehicle 110 includes vehicle identification data, such as, for example, a vehicle identification number (VIN), a telematics device ESN, a mobile identification number (MIN), and the like. The vehicle identification information (including the phone number) transmitted may be used to identify the caller.

It is to be understood that calls received at the call center 170 may come from an electronic device other than the telematics unit 120, such as, for example, cellular phones, landline telephones, or the like. In such instances, the information transmitted to the call center 170 may include the phone number of the device, and if the device includes a location detection unit, the location of the device. When the call is made from such an electronic device, communication services manager 174 will attempt to link the information associated with the electronic device with an existing subscriber profile. For example, the communication services manager 174 may query the database 176 for a subscriber having the electronic device phone number associated with his/her account. If the communication services manager 174 is unable to link the electronic device with an existing subscriber, the communication interface 172 may request additional information from the caller in order to identify him/her.

Once the information is received and the user is identified, the communication services manager 174 may access a profile associated with the user/caller (and stored in the database 176) to look up a previous request made by the user and to determine the time between the previous and current requests. It is to be understood that the previous request may include the most recent request made by the user or a list of the most recent requests (e.g., last 10 requests, requests made within the last week, or the like). The previous request may also include information about the advisor 178 that fulfilled or worked on the request. Once a new request is made by the user, it may be logged into the user's personal profile (along with the date and/or time of the request) for later retrieval and analysis.

Upon receiving all of the information (both transmitted with the call and retrieved from the user's profile), the communication services manager 174 analyzes the data and generates a list of menu options based on the analysis. In addition to potentially being related to the nature of the current request, the menu options may also correspond 1) with a previous behavior of the caller (e.g., the user consistently requests navigation instructions, and thus an option may be routing the call to a navigation advisor, process, or server), 2) with previous call(s) made by the caller (e.g., the user's last call was terminated before the transaction was complete, and thus an option may be completing the previous transaction), 3) with the then-current location of the caller (e.g., an option may be to speak to an advisor that is local to the user's area), or combinations thereof. Since the list of menu options is based on information received from and associated with the particular user, the menu options are personalized for that particular user. It is believed that the personalized menu options and the user selections from these options will facilitate more efficient handling and routing of calls through the call center 170.

The menu options are transmitted to the user via the telematics device 120 in mobile vehicle 110 through wireless carrier system 140, communication network 142, land network 144, wireless modem 124, communication interface 172, and network 180. The menu options provide the user with one or more choices regarding the current call. It is to be understood that the menu option selected will assist the call center 170 in properly and efficiently handling/routing the current call.

The user receives the menu options, for example, on the display 190 in the vehicle 110. It is to be understood that the menu options may also be presented to the user verbally. In response, the user selects the option that is desirable to him/her. The selected option is transmitted to the communications interface 172, which then routes the call to an appropriate advisor 178 according to the selected option. For example, if the user selects a menu option to complete a previous incomplete call, the communications interface 172 will route the call to the advisor 178 with whom the caller was previously speaking. It is to be understood that the information about the selected option (and any of the other information, e.g., the current request) may also be transmitted to the advisor 178 in order to further assist the advisor 178 in fulfilling the user's current request.

In one example, the communication services advisor 178 is a real advisor. In another example, the communication services advisor 178 is implemented as a virtual advisor. The real advisor is a human being located at the call center 170 or located remotely from but working through the call center 170 that is placed in verbal communication with the service subscriber in mobile vehicle 110 via telematics device 120. In another example, a virtual advisor or technical virtual advisor is implemented as a synthesized voice interface responding to requests from telematics device 120 in mobile vehicle 110. The virtual advisor is embodied in software executing on a computing system that provides automated service functions.

The communication services advisor 178 assists the caller in fulfilling his/her request. The advisor 178 may provide service functions (such as those listed hereinabove, including, for example, navigation assistance) directly to telematics device 120 in mobile vehicle 110. The communication services advisor 178 communicates with the telematics device 120 in mobile vehicle 110 through wireless carrier system 140, communication network 142, and land network 144 using voice transmission, or through communication services manager 174 and communication interface 172 using data transmissions. As previously described, the communication interface 172 selects between voice transmissions and data transmissions.

Referring now to FIG. 2, an example of a call routing system 200 and the method for enhancing call center services is depicted. It is to be understood that the components of call routing system 200 are part of and are operational within the illustrative operating environment of FIG. 1.

In this example, the vehicle user may initiate a call to the call center 170 using the telematics unit 120. When the call is made, the phone number, the current location of the vehicle 110 and the time of the request are transmitted to the communication services manager 174 via the interface 172. It is to be understood that the nature of the request (e.g., request for navigation services) may or may not be communicated by the user initially. In an example in which the nature of the request is transmitted to the communication services manager 174 (e.g., the user indicates he/she wants to request navigation instructions), the analysis may tailor the menu options to correspond with the particular request. In an example in which the nature of the request is not transmitted (e.g., the user indicates he/she would like to speak to an advisor 178, but does not specify the reason for calling), the analysis may result in a variety of menu options which take into consideration, for example, current location and call history.

As shown in FIG. 2, the caller has not specified the nature of his/her request, and thus the phone number (and potentially other vehicle identifying information), current vehicle 110 location and the date/time of the call is transmitted to the communication services manager 174 (shown at number 1). In this example, the call is received at 8:30 pm on January 10 and the vehicle 110 is located in Detroit, Mich. (it is to be understood that the location may be a precise (e.g., an address) or a more general location (a particular city)).

The communication services manager 174 utilizes the phone number to identify the subscriber and to access his/her profile, as shown at number 2. The subscriber's profile illustrates his/her call history. In this example, the analysis of the caller's history indicates that he/she called for roadside assistance at 8 pm the same day, that the subscriber frequently calls for navigation instructions, and that the subscriber frequently talks to advisor X. This information, in addition to the fact that the current call is received at 8:30 pm from Detroit, Mich. is used to generate menu options to be presented to the user/caller. Examples of how the information is analyzed include 1) the fact that the user called 0.5 hours ago for roadside assistance and that the user is still in the same area may contribute to the generation of a menu option regarding roadside assistance, and 2) the fact that the user frequently calls for navigation instructions and that the user is located in Detroit, Mich. may contribute to the generation of a menu option regarding navigation instructions and advisors in Detroit, Mich.

Non-limiting examples of menu options that may be generated from the analysis include those shown at number 3, namely 1) speak to advisor X, 2) link to roadside assistance advisor, or 3) link to navigation instruction advisor in Detroit, Mich. Once the menu options are generated, they are transmitted to the vehicle 110, shown at number 4, and are displayed or otherwise transmitted to the user.

The user then selects one of the menu options and transmits this selection back to the interface 172, as shown at number 5. The interface 172 then selects an appropriate advisor 178 based on the selected option.

It is to be understood that one or more of the components of the system 100, 200 are embodied in a computer readable medium containing computer readable code such that the process of routing calls may be implemented when the computer readable code is executed on a computing device.

While several examples have been described in detail, it will be apparent to those skilled in the art that the disclosed examples may be modified. Therefore, the foregoing description is to be considered exemplary rather than limiting.

The invention claimed is:

1. A method for enhancing call center services, the method comprising:
receiving, at the call center, a call from a user;
receiving data associated with the call at the call center, wherein the data includes a phone number associated with the call, a location of a vehicle associated with the call, a current request of the user, and vehicle identification information;
analyzing, via a communication services manager, the phone number associated with the call, the location of a vehicle associated with the call, the current request of the user, a previous request of the user, a time period between the previous request and the current request, a vehicle identification number (VIN), and a device identification code selected from a telematics device electronic serial number and a telematics device mobile identification number;
generating a list of menu options based on the analysis;
presenting the list of menu options to the user;
inputting a user selected menu option via an in-vehicle telematics unit, a wireless device, or a landline telephone;
transmitting, via a communications system operatively connecting the in-vehicle telematics unit or the wireless device or the landline telephone with the call center, the user selected menu option to the call center; and
routing the call to an appropriate advisor based on a received user selected menu option.

2. The method as defined in claim 1, further comprising providing services to the user, the services including enrollment services, navigation assistance, directory assistance, roadside assistance, business assistance, residential assistance, information services assistance, emergency assistance, communications assistance, retrieval of vehicle telematics data, or combinations thereof.

3. The method as defined in claim 1 wherein prior to routing the call, the method further comprises providing the appropriate advisor with information pertaining to at least one of the current request of the user or the user selected menu option.

4. A system for enhancing call center services, the system comprising:

a telephony system at a call center for receiving a call from a user;

data associated with the call and transmitted to the call center during the call, the data including a phone number associated with the call, a location of a vehicle associated with the call, and vehicle identification information;

other data stored in a profile at the call center, the other data including a previous request of the user and a time period between the previous request and a current request;

a module at the call center configured to i) analyze the phone number associated with the call, the location of a vehicle associated with the call, the current request of the user, the previous request of the user, the time period between the previous request and the current request, a vehicle identification number (VIN), and a device identification code selected from a telematics device electronic serial number and a telematics device mobile identification number, and ii) generate a list of menu options based on the analysis;

an in-vehicle telematics unit, a wireless device, or a landline telephone configured to i) make the call, ii) receive the list of menu options, and iii) receive a user selected menu option;

a communication system operatively connecting the in-vehicle telematics unit, the wireless device, or the landline telephone with the call center to transmit the user selected menu option to the telephony system; and an appropriate advisor configured to receive the call from the telephony system after the call is routed based on the user selected menu option.

5. The system as defined in claim 4 wherein the appropriate advisor is capable of providing services to the user, the services including enrollment services, navigation assistance, directory assistance, roadside assistance, business assistance, residential assistance, information services assistance, emergency assistance, communications assistance, retrieval of vehicle telematics data, or combinations thereof.

6. The system as defined in claim 4 wherein the appropriate advisor is configured to receive information pertaining to at least one of the current request of the user or the user selected menu option prior to receiving the call.

7. The system as defined in claim 4, further comprising a record, associated with the user and maintained at the call center, for storing the previous request and a time and date associated therewith.

8. A system for enhancing call center services, comprising:
a call center;
a vehicle;
an electronic device chosen from an in-vehicle telematics unit, a wireless device, or a landline telephone associated with the vehicle for communicating with the call center, for receiving a list of menu options from the call center, and for receiving a user selected menu option;

data associated with a call made from a user of the electronic device to the call center, the data including a phone number associated with the electronic device, a location of the vehicle, and vehicle identification information;

a plurality of operator stations at the call center;

other data stored in a profile at the call center, the other data including a previous request of the user and a time period between the previous request and a current request of the user of the electronic device;

a module at the call center for:
analyzing the phone number associated with the electronic device, the location of the vehicle, the current request of the user of the electronic device, the previous request of the user, the time period between the previous request and the current request, a vehicle identification number (VIN), and a device identification code selected from a telematics device electronic serial number and a telematics device mobile identification number; and
generating the list of menu option based on the analysis; and a telephony system at the call center for:
receiving the call from the user of the electronic device;
receiving a user selected menu option from the electronic device; and
routing the call to an appropriate one of the plurality of operators based on the received user selected menu option.

9. The system as defined in claim 8 wherein the advisor is capable of providing services to the user, the services including enrollment services, navigation assistance, directory assistance, roadside assistance, business assistance, residential assistance, information services assistance, emergency assistance, communications assistance, retrieval of vehicle telematics data, or combinations thereof.

10. The method as defined in claim 1 further comprising:
identifying the user;
accessing a profile of the user to look up the previous request of the user; and
determining the time period between the previous request and the current request.

11. The method as defined in claim 10 wherein identifying the user includes querying a call center database for a subscriber associated with the vehicle identification information.

12. The method as defined in claim 1 wherein the menu options are choices for the user, wherein the choices are related to i) a nature of the current request, ii) a previous behavior of the user, iii) previous calls made by the user, iv) the location of the vehicle, or v) combinations of i, ii, iii, and iv.

13. The method as defined in claim 1, further comprising placing the call on hold while the analyzing takes place.

* * * * *